Sept. 8, 1931.  J. W. TATTER  1,822,714
STEERING AND BRAKING DEVICE
Filed Oct. 30, 1929  2 Sheets-Sheet 1

Witness:
William P. Kilroy

Inventor:
John W. Tatter
Hill & Hill
Attys

Sept. 8, 1931. J. W. TATTER 1,822,714
STEERING AND BRAKING DEVICE
Filed Oct. 30, 1929 2 Sheets-Sheet 2
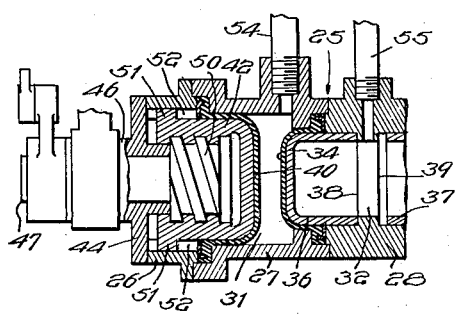
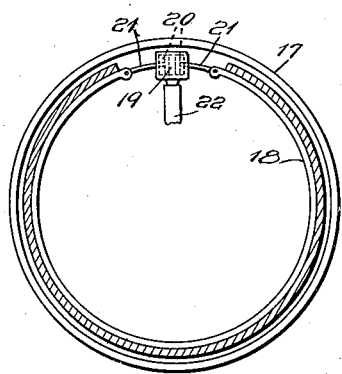
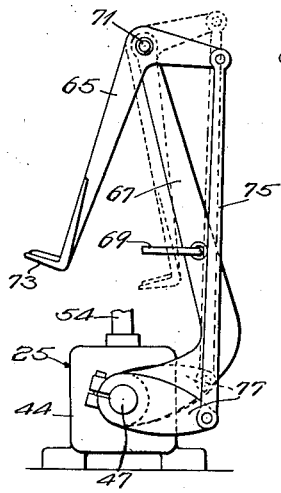
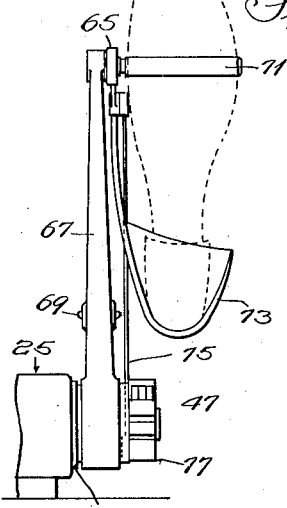
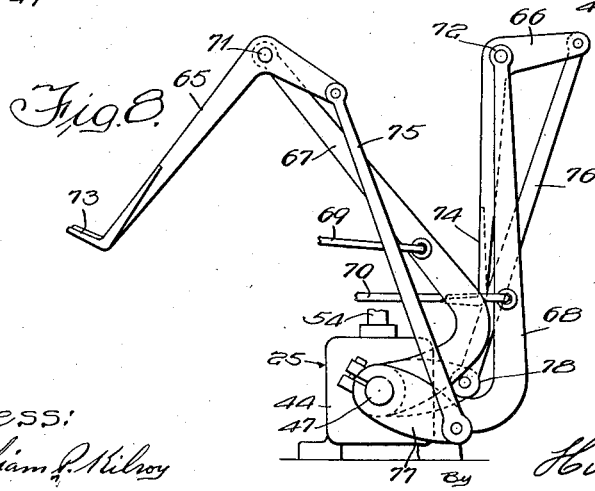
Inventor:
John W. Tatter
By Hill & Hill
Attys Patented Sept. 8, 1931

1,822,714

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

STEERING AND BRAKING DEVICE

Application filed October 30, 1929. Serial No. 403,517.

This invention relates to steering and braking devices, and is particularly adaptable for use in conjunction with the landing gear of aeroplanes for controlling the movement and operation of the plane while on the ground.

Heretofore, in bringing a plane to a stop, it has been necessary to shut off the engine and permit the plane to gradually slow down, and in turning or otherwise maneuvering a plane into desired position on the ground, it has been necessary to increase the speed of the engine until the force of the air from the propeller directed against the rudder is sufficient to swing the tail of the plane around the desired amount, or to increase the speed of the plane until the air pressure on the rudder is sufficient to swing the tail around.

By employing the present invention, the speed of the engine and propeller need be only sufficient to move the plane over the ground, the rotation of the wheels comprising the landing gear of the plane, being controlled by suitably constructed and arranged elements embodying my invention, and by the operation of which, the plane may be turned to the right or left, or may be gradually slowed down and brought to a stop.

One object of the present invention is to provide a novel and efficient brake mechanism for aeroplanes.

Another object of the invention is to provide a novel construction and arrangement whereby efficient braking and steering mechanism may be combined in a unitary structure which may be conveniently positioned and operated by suitable means for controlling the movements of an aeroplane while on the ground.

Another object of the invention is to provide a novel steering and braking mechanism for planes equipped with a three-wheel landing gear, the present invention being constructed and arranged in a manner to apply brakes to all three of the wheels of the landing gear, or to one or the other of the main or front wheels of the gear for the purpose of maneuvering the plane to the right or left while the plane is on the ground.

Another object of the invention is to provide a construction and arrangement whereby the braking and steering of the plane is accomplished by suitable control mechanism common to both the steering and braking devices.

A further object of the invention is to provide a structure wherein the braking and steering means employed for controlling the movement of the plane when on the ground are operatively related with certain of the means for controlling similar movement of the plane when aloft.

On many of the later type of planes, a caster wheel is being employed at the rear of the fuselage instead of the tail skid formerly used, for landing purposes and for supporting the tail of the plane when on the ground, and a particular object of the present invention is to provide suitable and efficient brake mechanism for applying a braking action to all three wheels comprising the landing gear of the plane, and at the same time providing for suitable control of the front wheel of the landing gear for guiding or directing the plane over the ground as desired.

A still further object of the invention is to improve devices of the character disclosed in sundry details hereinafter described and particularly pointed out in the appended claims.

One embodiment of the present invention is shown for illustrative purposes in the accompanying drawings in which Fig. 1 is a fragmentary front elevational view of a portion of an aeroplane structure illustrating the application of my improved steering and braking mechanism thereto;

Fig. 4 is a fragmentary sectional elevation of a portion of the steering and brake operating mechanism showing a changed position of some of the parts illustrated in Fig. 2;

Fig. 5 is an elevational view of a type of brake drum adapted to be secured to the wheels of the landing gear, and also a friction element operatively related thereto, the view illustrating diagrammatically a fluid pressure operated device for actuating the friction element;

Fig. 6 is a side elevational view of a portion of the manually operated means for controlling the operation of the brake and steering mechanism, and also for controlling the movements of a plane when aloft, the structure illustrated being viewed as indicated by the arrow in Fig. 1;

Fig. 7 is a rear elevational view of a portion of the structure illustrated in Fig. 6; and Fig. 8 is a side elevational view of the structure illustrated in Fig. 7 showing certain of the parts in changed position.

Figure 1:
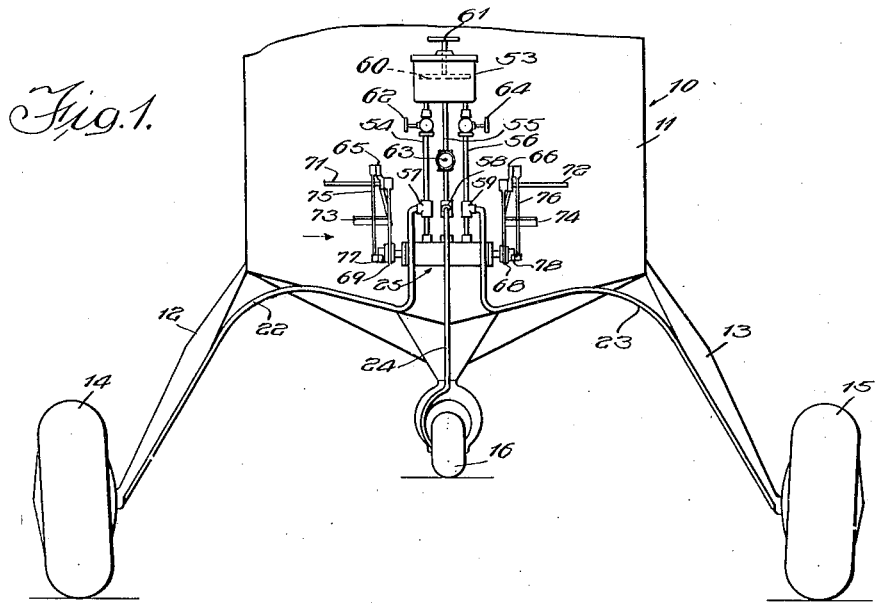

In the illustrative embodiment of the invention shown in the drawings, the aeroplane structure is designated as a whole by the reference character 10, and includes the fuselage 11 having landing gear struts 12 and 13 mounted thereon. At the lower ends of the respective struts are rotatably mounted landing gear wheels 14 and 15, while at the rear end of the fuselage is mounted a third landing gear or caster wheel 16 for supporting the rear end of the aeroplane structure when on the ground.

Suitably secured to each of the wheels 14, 15 and 16 is a brake member or drum 17 such as illustrated in Fig. 5 of the drawings, it being understood that the drum on the caster wheel 16 may be slightly smaller than those on the wheels 14 and 15, or may be constructed in the manner shown and described in my copending application, Serial No. 402,974, filed October 28, 1929. The said drums 17 have suitable friction elements or brake shoes 18 operatively related thereto, the friction element or shoe illustrated in Fig. 5 being of the internal expanding type adapted to be suitably anchored to a relatively fixed part of the landing gear structure and provided with actuating means shown diagrammatically in Fig. 5 as a chambered member 19 having pistons 20 mounted therein and operatively connected by means of links 21 to the ends of the friction elements or shoes 18, the chamber of the member 19 being adapted to receive fluid under pressure through a tube, shown in Fig. 5, as the tube 22 of the present structure, in a manner to move the pistons 20 outwardly or away from each other for expanding the friction element 18 into engagement with the drum 17.

The brake mechanism illustrated in Fig. 5 is typical of the structure applied to the wheels 14, 15 and 16, and in the present arrangement, the tube 22 is illustrated as supplying fluid under pressure to the brake mechanism operatively related to the wheel 14, the brake mechanism associated with the wheel 15 is supplied with fluid pressure by a tube 23 (Fig. 1), and the brake mechanism of the caster wheel 16 is supplied by a tube 24 flexibly connected to the brake mechanism in a manner to permit an oscillating movement of the caster wheel about its pivotal connection with the fuselage 11 when maneuvering the plane on the ground.

For actuating the plungers 20 in the chambered members 19, a housing, indicated as a whole by the numeral 25 and comprising a plurality of connected and aligned sections 26, 27, 28, 29, and 30, is suitably mounted in the fuselage of the plane, and as shown in the illustrative embodiment, is provided with a plurality of pressure chambers or cylinders 31, 32 and 33 in substantially longitudinal alignment.

The chamber 32 is formed in the section 28 of the housing 25 and is provided at its opposite end portions with sealing cups 34 and 35 preferably of resilient flexible material adapted to be secured to the section 28 by means of the sections 27 and 29, respectively, of the housing 25. Slidably mounted in the section 28 are a plurality of hollow floating pistons 36 and 37 operatively related to the sealing cups 34 and 35, respectively, and having their adjacent open end portions opening into the chamber 32 in a manner to form a continuation thereof. The inner surface of the section 28 is provided, adjacent its central portion, with shoulders 38 and 39 adapted to cooperate with the edge portions of the hollow pistons 36 and 37, respectively, for limiting the inward movement of the respective pistons.

The outer open ends of the sections 27 and 29 forming the cylinders or chambers 31 and 33, respectively, are closed by sealing cups 40 and 41, respectively, and like the sealing cups 34 and 35 are formed preferably of resilient flexible material adapted to be secured in the housing 25 and against the outer ends of the sections 27 and 28 by means of the sections 26 and 30, respectively, shown in the present instance as providing a part of the housing 25 and serving as guides for hollow pistons 42 and 43 operatively related to the sealing cups 40 and 41, and to the pressure chambers or cylinders 31 and 33, respectively.

Suitably mounted on the respective sections 26 and 30, preferably adjacent the outer ends thereof, are plates or closure members 44 and 45 having outwardly extending bosses 46 formed thereon, in which are mounted shafts 47 and 48, to the inner ends of which are connected screw members 49 and 50, respectively, having relatively heavy screwthreads 49a and 50a, respectively, formed thereon adapted to extend into the interior of the pistons 42 and 43, respectively, in a manner to engage and cooperate with suitably formed threads 42a and 43a, respectively, on the interior of the hollow pistons 42 and 43 positioned within the sections 26 and 30 mounted on the end portions of the housing 25.

Formed on the periphery of the hollow pistons 42 and 43, preferably adjacent the open ends thereof, are a plurality of radially disposed longitudinally extending lugs or ribs 51 adapted to slidably engage cooperating radially disposed longitudinally extending grooves 52 formed in the inner faces of the sections 26 and 30, thereby permitting longitudinal movement of the pistons 42 and 43 within the sections 26 and 30, and at the same time securing the pistons against rotation with respect to the sections.

For supplying fluid under desired or predetermined pressure to the cylinders or chambers 31, 32 and 33, and to the fluid pressure operated means 19 associated respectively with the wheels 14, 15 and 16 of the landing gear, a fluid reservoir 53 (Fig. 1) may be suitably mounted in the fuselage 11 of the plane and provided with tubes or conduits 54, 55 and 56 communicating with the interior of the chambers or cylinders 31, 32 and 33, respectively, the conduits 54, 55 and 56 being provided, in the present instance, with T-fittings 57, 58 and 59 adapted to receive the tubes 22, 24 and 23, respectively, by means of which communication is established with the pressure operated means 19 related to the wheels 14, 15 and 16 of the landing gear.

For exerting sufficient pressure on the fluid in the system to insure operation of the device, a plunger 60 mounted in the fluid reservoir 53 may be moved downwardly within the reservoir by rotating a hand wheel 61, thereby exerting a uniform pressure on the fluid throughout the system of chambers and tubes sufficient to place the friction elements or brake shoes 18 in the desired position with respect to the brake drums 17, but not sufficient to move the friction elements into engagement with the drums. After the desired pressure in the system is obtained, a plurality of valves 62, 63 and 64 positioned in the conduits 54, 55 and 56, respectively, may be closed to hold the predetermined or initial pressure within the system.

For actuating the pressure operated friction elements 18, a plurality of bell crank levers 65 and 66 are provided and shown, in the present instance, as pivotally mounted on the upper end portions of levers 67 and 68 journalled at their lower end portions on the bosses 46 in a manner to rotate freely thereon, the levers 67 and 68 being provided with cables 69 and 70, or other suitable means, adapted to be connected with the rudder of the aeroplane for controlling the movements of the plane when aloft, and, when desired, for assisting in controlling the movement of the plane when on the ground.

Mounted adjacent the upper ends of the levers 67 and 68 preferably coincident with the pivotal center of the bell crank levers 65 and 66 are outwardly extending rods or bars 71 and 72 adapted to be engaged by the toe portion of the aviator's foot as illustrated in Fig. 7 for manipulating the rudder to control right and left turns of the plane.

It will be noted by reference to Figs. 1, 6, 7, and 8 that the long arms of the bell crank levers 65 and 66 are provided with stirrup portions 73 and 74, respectively, adapted to receive the heel portion of the aviator's foot, while the short arms of the bell crank levers 65 and 66 are connected by means of links 75 and 76, respectively, with arms 77 and 78 secured to the outer ends of the shafts 47 and 48, respectively, to the inner ends of which are secured the screw members 49 and 50.

For slowing down or bringing the plane to a stop after it has landed, the operation of the device is substantially as follows: Assuming that the system, comprising the chambers 31, 32 and 33, tubes 22, 23, and 24, and the chambered members 19 associated with the brake mechanism on the wheels 14, 15 and 16 of the landing gear, is filled with fluid under relatively slight substantially uniform pressure in the manner above described, the aviator or pilot of the plane, by exerting pressure simultaneously on the heel engaging stirrups 73 and 74, may rock the bell crank levers 65 and 66 about their pivotal connections with the levers 67 and 68, and through the connecting links 75 and 76 and arms 77 and 78, rotate the screw members 49 and 50 in a manner to cause the pistons 42 and 43 to be moved inwardly of the housing toward each other, thereby elongating the walls of the resilient flexible sealing cups 40 and 41 and restricting or reducing the capacity of the chambers 31 and 33 which will force the fluid through the tubes 54 and 56, T-fittings 57 and 59, and tubes 22 and 23 to the members 19 of the wheels 14 and 15 for moving the pistons 20 and links 21 outwardly in a manner to expand the friction elements or brake shoes 18 simultaneously into engagement with the drum 17 mounted on the wheels 14 and 15 of the landing gear, thereby retarding rotation of both wheels 14 and 15. At the same time, that the pistons 42 and 43 are moved inwardly toward each other by the screw members 49 and 50, the increased or greater than normal pressure created in the chambers 31 and 32 will force the pistons 36 and 37 inwardly toward each other in a manner to restrict or reduce the capacity of the chamber 32, thereby forcing the fluid through the tube 55, T-fitting 58 and tube 24 to the member 19 of the wheel 16 for moving the pistons 20, links 21 and brake shoe 18 related to the wheel 16 outwardly into operative engagement with a cooperating brake element or drum carried by the caster wheel 16, thereby retarding rotation of the caster wheel in a manner common in brake construction, and operating in conjunction with the braking devices on the wheels 14 and 15 to slow down the plane or bring it to a complete stop.

It will be observed from the foregoing description that by reason of the uniform fluid pressure in the system, and the relative position and cooperation of the pistons 42, 36, 37 and 43, that a substantially uniform pressure will be applied to the braking mechanism on the wheels 14, 15 and 16 of the landing gear thereby providing an efficient braking action at all points of ground contact.

It will be observed further from the foregoing description that the construction and arrangement illustrating the present embodiment of the invention provides a novel and efficient device for simultaneously applying a braking action to all three of the wheels comprising the landing gear of an aeroplane, and that novel means are employed for manually controlling the operation of the brake mechanism.

If, however, the pilot desires to taxi the plane and maneuver it to the right or left to obtain a desired position on the field, this may be done in the following manner: Assuming that a right turn is desired, the aviator or pilot, by exerting heel pressure on the stirrup 73 only, of the bell crank lever 65, may rock the lever about its pivotal connection with the lever 67 as indicated by dotted lines in Fig. 6 and through the connecting link 75 and arm 77, rotate the shaft 47 in its bearing, thus causing the screw member 49 to rotate and move the piston 42 inwardly with respect to the chamber 31, thereby forcing fluid through the tube 54, T-fitting 57 and tube 22 into the member 19 for expanding the friction element 18 into engagement with the drum 17 associated with the wheel 14 of the landing gear, thus retarding or creating a drag on the wheel 14, and, by reason of the fact that the wheel 15 is permitted to rotate freely, causing the body of the plane to swing about the wheel 14 as a center. When the desired position of the plane is attained in this manner, the pressure on the stirrup 73 may be released, permitting the piston 42 to assume its normal position whereupon the plane may be taxied in a straight-away direction as desired.

During the steering or guiding operation above described, the piston 36, due to pressure exerted in the chamber 31, will be moved inwardly toward the central portion of the housing 25, but is limited in its movement in an inwardly direction by reason of the shoulder 38 against which the edge of the piston 36 engages, thereby providing a stop for the piston 36 to permit a suitable pressure to be built up within the chamber 31 for operating the braking mechanism on the wheel 14, and although the piston 36 is moved inwardly, thereby tending to reduce the capacity of the chamber 32, and although such inward movement of the piston 36 may cause a slight outward movement of the piston 37, thereby tending to reduce the capacity of the chamber 33, such slight movements of the pistons 36 and 37, owing to the equalization and distribution of the slight increase in pressure caused by the movements of the pistons, is not sufficient to cause any braking action on the wheels 14 and 16 by reason of the slight reduction in the capacity or cubic content of the chambers 32 and 33.

Figure 2:
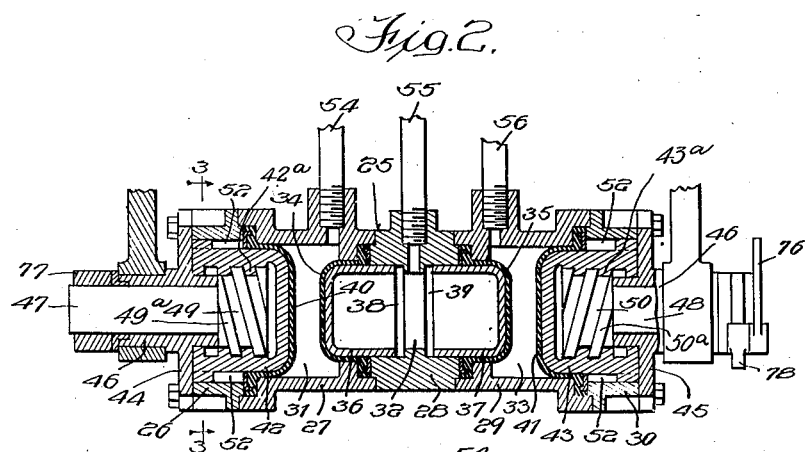
Fig. 2 is a longitudinal sectional front elevation of a portion of the steering and brake operating mechanism.
Figure 3:
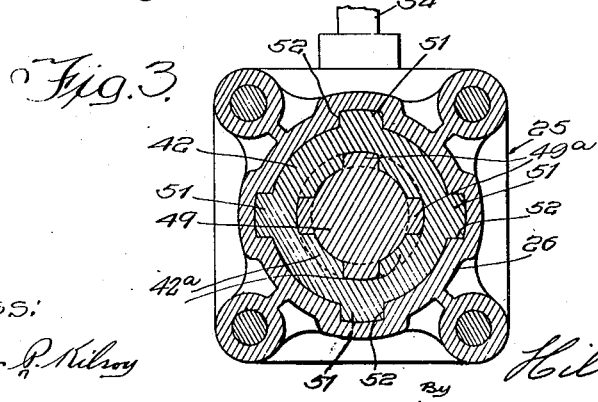
Fig. 3 is a transverse sectional elevation of a portion of the operating mechanism taken on the line 3—3 of Fig. 2.

A left hand turn may be accomplished in a similar manner by exerting pressure on the stirrup 74, thereby rotating the screw member 50 and moving the piston 43 inwardly with respect to the chamber 33 for actuating the brake mechanism associated with the landing gear 15, and, as pointed out in connection with making a right turn, the fact that a slight movement of the pistons 37 and 36 toward the left of Fig. 2 tending to reduce the capacity or cubic content of the chambers 31 and 32, such movement will not be sufficient to effect a braking action on the wheels 14 and 16 of the landing gear, the shoulder 39 serving to limit the inward movement of the piston 37 in a manner to permit sufficient pressure to be built up within the chamber 33 for actuating the brake mechanism associated with the wheel 15 of the landing gear. It will be observed, however, that when both pistons 42 and 43 and the pistons 36 and 37 are moved inwardly simultaneously, that the combined movement of the pistons will cause a sufficient pressure to be built up within the chambers 31, 32 and 33 to actuate the brake mechanism associated with all of the wheels 14, 15 and 16 of the landing gear.

If desired, the turning movement of the plane may be accelerated by manipulating the rudder of the plane, as for example, in making a left turn, in addition to exerting heel pressure on the stirrup 74 for retarding the rotation of the landing wheel 15, pressure may also be exerted on the rod 72, thereby rocking the lever 68 on its pivotal connection with the boss 46, to the position shown in Fig. 8 of the drawings, and through its associated cable 70 swinging the rudder of the plane to a position where any pressure against the face of the rudder will tend to turn the plane to the left. Obviously, a similar pressure exerted simultaneously on the stirrup 73 and rod 71 will accelerate the movement of the plane in making a right turn.

It will be observed from the foregoing description that the present invention provides a novel construction and arrangement whereby a plane may be slowed down or brought to a complete stop after landing, and wherein suitable means are provided for manipulating brake mechanism on all three wheels of the landing gear of a plane, and wherein right and left turns may be made in maneuvering the plane on the ground without accelerating the speed of the engine as heretofore described, also that by mounting the brake and steering control mechanism on the rudder operating levers of the plane, both the steering and rudder operating means may be conveniently and simultaneously actuated for accelerating the turning or steering movements of the plane.

Obviously, the present invention is not limited to the precise construction and arrangement shown and described as the same may be variously modified. Moreover, all the features of the invention need not be used conjointly as the same may be used to advantage in variously different combinations and sub-combinations.

Having thus described my invention, I claim:

1. In a device of the class described, the combination of a plurality of brake drums, brake elements operatively related thereto, a plurality of fluid pressure operated means for actuating said elements, a housing having a plurality of cylinders formed therein communicating respectively with said pressure operated means, means for supplying fluid under pressure to said cylinders and pressure operated means, pistons movable longitudinally in said housing and operatively related to said cylinders, rotatable screw members for actuating certain of said pistons independently of other of said pistons, and manually operated means for selectively rotating one or more of said screw members to actuate one or more of said pistons in a manner to increase the pressure in one or more of said cylinders for actuating one or more of said brake elements.

2. In a steering and braking device for aeroplanes, the combination of a plurality of brake drums carried respectively by the landing wheels of an aeroplane, brake elements operatively related respectively to said drums, fluid pressure operated means for actuating said elements respectively, a housing having a plurality of pressure cylinders formed therein communicating respectively with said pressure operated means, means for supplying fluid under substantially uniform pressure to said cylinders and pressure operated means, pistons mounted in said cylinders, screw members mounted in said housing and operatively related to certain of said pistons for moving them longitudinally of said cylinders, levers mounted on said housing and operatively related to the rudder of the aeroplane, independently and manually operated means mounted on said levers for actuating one or another or all of said screw members for increasing the pressure in one or another or all of said cylinders in a manner to apply said brake elements to one or another or all of said brake drums carried by the landing wheels of the aeroplane.

3. In a device of the class described, the combination of a plurality of brake drums, brake elements operatively related thereto respectively, a plurality of fluid pressure operated means for actuating said elements, a housing, closure members secured to the ends thereof, a plurality of pistons mounted in said housing in a manner to form a plurality of cylinders or chambers therein and movable longitudinally in said housing, means operatively related to said cylinders and communicating respectively with said pressure operated means, means for supplying fluid under pressure to said cylinders and pressure operated means, screw members rotatably mounted in said closure members and operatively related to said pistons for moving the pistons in a manner to reduce the capacity of said chambers, and manually operated means for selectively rotating one or more of said screw members to actuate one or more of said pistons in a manner to increase the pressure in one or more of said chambers for actuating one or more of said brake elements.

4. In a steering and braking device for aeroplanes, the combination of a plurality of brake mechanisms operatively related respectively to the landing wheels of an aeroplane, means for actuating said mechanisms, said means including a housing, closure members secured to the ends thereof, a plurality of pistons slidably mounted in said housing in a manner to form a plurality of fluid pressure chambers therein, means for supplying fluid under pressure to said chambers, means communicating with said brake mechanisms and said chambers, shoulders in said housing for limiting the movement of certain of said pistons, screw members rotatably journalled in said closure members and operatively related to certain other of said pistons for moving said last mentioned piston longitudinally in said housing when said screw members are rotated in a maner to force the fluid from said chambers, manually operated means for rotating said screw members independently or simultaneously, and means for maintaining substantially uniform fluid pressure in said chambers.

5. In a steering and braking device for aeroplanes, the combination of a plurality of brake mechanisms operatively related respectively to the front and rear landing wheels of an aeroplane, means for actuating said mechanisms, said means including a housing, closure members secured to the ends thereof, a plurality of aligned pistons slidably mounted in said housing in a manner to form a pressure chamber adjacent the central portion of the housing, and a plurality of chambers positioned respectively at opposite sides thereof, means for supplying fluid under pressure to said chambers, means communicating with said chambers and operatively related to said brake mechanisms, means positioned in said central chamber for limiting the inward movement of adjacent pistons, means rotatably mounted in each of said closure members and cooperable with other of said pistons for moving said last mentioned pistons longitudinally of said housing, manually operated means for actuating said rotatable means simultaneously or independently of each other, and means for varying the normal pressure in said chambers.

6. In a steering and braking device for aeroplanes, the combination of a plurality of brake mechanisms operatively related respectively to the front and rear landing wheels of an aeroplane, means for actuating said mechanisms, said means including a housing, closure members secured to the ends thereof, a plurality of aligned pistons slidably mounted in said housing in a manner to form a central pressure chamber and end pressure chambers in said housing, a source of fluid pressure supply, conduits communicating with the respective end chambers and said source of supply and operatively related to the brake mechanism of the front landing wheels of the aeroplane, conduits communicating with said central chamber and said source of supply and operatively related to the brake mechanism of the rear landing wheel of the aeroplane, means rotatably mounted in each of said closure members and cooperable with certain of said pistons for moving said last mentioned pistons longitudinally of said housing, and manually operated means for actuating said rotatable means independently of each other in a manner to force fluid through one or the other of the conduits communicating with the end chambers for actuating the brake mechanisms associated with the front landing wheels of the aeroplane, or for actuating said rotatable means simultaneously in a manner to force fluid through all of said conduits for actuating the brake mechanisms on both the front and rear wheels of the aeroplane.

7. In a steering and braking mechanism for aeroplanes, the combination of a plurality of brake mechanisms operatively related respectively to the front and rear landing wheels of an aeroplane, means for actuating said mechanism, said means including a housing comprising a plurality of aligned sections, resilient flexible sealing cups positioned between adjacent ends of said sections in a manner to form a central pressure chamber and end pressure chambers within said housing, a pair of oppositely disposed floating pistons slidably mounted in said central chamber and operatively related to adjacent sealing cups, means cooperable with said floating pistons for limiting the inward movement thereof, closure members secured to the ends of said housing, end pistons slidably mounted in said housing adjacent the ends thereof and operatively related to other of said sealing cups, means for securing said end pistons against rotation, a source of fluid pressure supply, conduits communicating with the respective end chambers and said source of supply and operatively related to the brake mechanism of the front landing wheels of the aeroplane, conduits communicating with said central chamber and said source of supply and operatively related to the brake mechanism of the rear landing wheel of the aeroplane, means rotatably mounted in each of said closure members and cooperable with said end pistons for moving the end pistons longitudinally of said housing, and manually operated means for actuating said rotatable means independently of each other in a manner to force fluid through one or the other of the conduits communicating with said end chambers for actuating the brake mechanism associated with one or the other of the front landing wheels of the aeroplane, or for actuating said rotatable means simultaneously in a manner to force fluid through all of said conduits for actuating the brake mechanisms on both the front wheels and the rear wheel of the aeroplane.

8. In a device of the class described, the combination of a plurality of brake drums, brake elements operatively related thereto, a plurality of fluid pressure operated means for actuating said elements, a housing having a plurality of chambers formed therein communicating respectively with said pressure operated means, fluid impellers movably mounted in said housing and operatively related to said chambers, rotatable means for actuating certain of said impellers independently of other of said impellers, and manually operated means for selectively actuating one or more of said rotatable means to actuate one or more of said impellers in a manner to increase the pressure in one or more of said chambers for actuating one or more of said brake elements.

9. In a device of the class described, the combination of a plurality of brake drums, brake elements operatively related thereto, a plurality of fluid pressure operated means for actuating said elements, a housing having a plurality of cylinders formed therein communicating respectively with said pressure operated means, means for supplying fluid under pressure to said cylinders and pressure operated means, pistons movably mounted in said housing and operatively related to said cylinders, piston operating means for actuating certain of said pistons independently of other of said pistons, and manually operated means for selectively actuating one or more of said piston operating means to actuate one or more of said pistons in a manner to increase the pressure in one or more of said cylinders for actuating one or more of said brake elements.

10. In a hydraulically actuated brake mechanism, the combination of a plurality of brake drums carried respectively by two front wheels and a rear wheel of a vehicle, a plurality of brake elements operatively related respectively to said brake drums, a plurality of pressure cylinders operatively related respectively to said brake elements, pistons mounted in said cylinders, and a pair of separate independent disconnected manually operated means for moving said pistons in said cylinders to actuate one or another of the brake elements associated with the brake drums of said front wheels when one or another of said manually operated means is actuated, without effecting the brake element associated with the drum of said rear wheel.

11. In a hydraulically actuated brake mechanism, the combination of a plurality of brake drums carried respectively by two front wheels and a rear wheel of a vehicle, a plurality of brake elements operatively related respectively to said brake drums, a plurality of pressure cylinders operatively related respectively to said brake elements, pistons mounted in said cylinders, and a pair of separate independent disconnected manually operated means for moving said pistons in said cylinders to actuate the brake element associated with the brake drum of said rear wheel when both said manually operated means are actuated.

12. In a hydraulically actuated brake mechanism, the combination of a plurality of brake drums carried respectively by two front wheels and a rear wheel of a vehicle, a plurality of brake elements operatively related respectively to said brake drums, a plurality of pressure cylinders operatively related respectively to said brake elements, pistons mounted in said cylinders, and a pair of separate independent disconnected manually operated means for moving said pistons in said cylinders to actuate one or another of the brake elements associated with the brake drums of said front wheels when one or another of said manually operated means is actuated, and to actuate all of said brake elements when both of said manually operated means are actuated.

In witness whereof, I hereunto subscribe my name this 15th day of October, A. D., 1929.

JOHN W. TATTER.